(12) United States Patent
Vander Helm et al.

(10) Patent No.: US 10,565,804 B2
(45) Date of Patent: *Feb. 18, 2020

(54) SUSTAINABLE REAL-TIME PARKING AVAILABILITY SYSTEM

(71) Applicant: Park Green, LLC, Sioux Center, IA (US)

(72) Inventors: Warren C. Vander Helm, Sioux Center, IA (US); David L. Vogel, Sioux Center, IA (US); Michael T. Holm, Sioux Center, IA (US)

(73) Assignee: Park Green, LLC, Sioux Center, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/382,841

(22) Filed: Apr. 12, 2019

(65) Prior Publication Data

US 2019/0236853 A1 Aug. 1, 2019

Related U.S. Application Data

(63) Continuation-in-part of application No. PCT/US2016/042920, filed on Jul. 19, 2016, which is
(Continued)

(51) Int. Cl.
*G07B 15/02* (2011.01)
*G06Q 10/02* (2012.01)
*G08G 1/14* (2006.01)

(52) U.S. Cl.
CPC ............. *G07B 15/02* (2013.01); *G06Q 10/02* (2013.01); *G08G 1/142* (2013.01); *G08G 1/144* (2013.01); *G08G 1/146* (2013.01)

(58) Field of Classification Search
CPC ........ G07B 15/02; G08G 1/142; G08G 1/144; G08G 1/146; G06Q 10/02
See application file for complete search history.

(56) References Cited

U.S. PATENT DOCUMENTS 5,832,454 A * 11/1998 Jafri ...................... G06Q 10/02
                                                                         705/6
7,617,136 B1 * 11/2009 Lessing ................ G06Q 10/087
                                                                         705/22
(Continued)

FOREIGN PATENT DOCUMENTS

WO       2014080388 A2      5/2014
WO   WO-2014080388 A2 *    5/2014
(Continued)

OTHER PUBLICATIONS

Idris, "Parking Guidance System Utilizing Wireless Sensor Network and Ultrasonic Sensor", published by Information Technology Journal 8, 2009, p. 138-146 (Year: 2009).*
(Continued)

*Primary Examiner* — Kevin H Flynn
*Assistant Examiner* — Omar Zeroual
(74) *Attorney, Agent, or Firm* — Luke C. Holst; McGrath North Mullin & Kratz, PC LLO

(57) ABSTRACT

The present invention relates in general to parking availability systems and methods of parking, and more specifically, to a parking system that manages individual parking spaces in real-time. Notably, the present invention gives a parking asset owner flexibility to adjust parking prices for individual parking spaces within a parking facility in real-time depending upon dynamic market conditions such as demand, convenience, and location. The purpose of the invention is to offer parking consumers a choice in parking price tiers to encourage turnover and maximize revenue streams for the parking asset owner. Additional benefits of the present invention to the parking asset owner include improved service to customers, obtaining LEED credits, reducing harmful carbon emissions, mitigating transportation demand, saving time through stream-lined parking operations, and eco-friendly solutions to parking problems
(Continued)

not solved by traditional parking models. The present invention may further utilize unmanned systems technology to help parking consumers locate available parking spaces within the parking facility and to provide supervision at the parking facility.

19 Claims, 7 Drawing Sheets

Related U.S. Application Data a continuation-in-part of application No. 14/821,074, filed on Aug. 7, 2015, now Pat. No. 10,262,467.

(56) References Cited

U.S. PATENT DOCUMENTS

| | | | | |
|---|---|---|---|---|
| 7,889,099 B2* | 2/2011 | Aubrey | G07B 15/02 340/905 |
| 7,956,769 B1* | 6/2011 | Pearl | G08G 1/14 340/539.1 |
| 8,190,457 B1* | 5/2012 | Chandler | G06Q 10/02 705/5 |
| 8,332,260 B1* | 12/2012 | Mysen | G06Q 30/02 380/231 |
| 9,030,153 B2* | 5/2015 | Littrell | G06Q 20/102 320/104 |
| 9,123,034 B2* | 9/2015 | Rydbeck | G06Q 20/145 |
| 2002/0099574 A1* | 7/2002 | Cahill | G06Q 10/02 705/5 |
| 2002/0161610 A1* | 10/2002 | Walker | G06Q 10/02 705/5 |
| 2004/0068433 A1* | 4/2004 | Chatterjee | G06Q 20/127 705/13 |
| 2004/0252034 A1* | 12/2004 | Slemmer | G08G 1/14 340/932.2 |
| 2005/0096974 A1* | 5/2005 | Chagoly | G08G 1/14 705/13 |
| 2005/0177432 A1* | 8/2005 | Nevergole | G06Q 20/20 705/16 |
| 2005/0228702 A1* | 10/2005 | Fairbanks | G06Q 10/02 705/5 |
| 2005/0280555 A1* | 12/2005 | Warner, IV | G08G 1/14 340/932.2 |
| 2006/0015397 A1* | 1/2006 | Vitrano, Jr. | G06Q 10/02 705/13 |
| 2006/0250278 A1* | 11/2006 | Tillotson | G08G 1/14 340/932.2 |
| 2007/0040701 A1* | 2/2007 | Browne | G08G 1/14 340/932.2 |
| 2007/0257106 A1* | 11/2007 | Sarkany | G06Q 30/06 235/380 |
| 2007/0290888 A1* | 12/2007 | Reif | G07B 15/02 340/932.2 |
| 2009/0087290 A1* | 4/2009 | Wastel | B66F 7/02 414/240 |
| 2010/0030591 A1* | 2/2010 | Viard | G06Q 10/02 705/5 |
| 2010/0052946 A1* | 3/2010 | Levine | G08G 1/143 340/932.2 |
| 2010/0069148 A1* | 3/2010 | Cargill | A63F 13/65 463/25 |
| 2010/0161393 A1* | 6/2010 | Littrell | G06Q 20/127 705/13 |
| 2011/0004507 A1* | 1/2011 | Potkonjak | G06Q 10/06375 705/7.37 |
| 2011/0166897 A1* | 7/2011 | Beckman | G06Q 10/02 705/5 |
| 2011/0213672 A1* | 9/2011 | Redmann | G06Q 20/209 705/24 |
| 2011/0231212 A1* | 9/2011 | Hurley | G06Q 10/02 705/5 |
| 2011/0238460 A1* | 9/2011 | Al-Dawsari | G06Q 10/06 705/7.31 |
| 2011/0270669 A1* | 11/2011 | Rowe | G06Q 30/02 705/14.37 |
| 2011/0320256 A1* | 12/2011 | Florucci | G07B 15/02 705/14.33 |
| 2012/0035966 A1* | 2/2012 | Maguire | G06Q 10/02 705/5 |
| 2012/0092190 A1* | 4/2012 | Stefik | G06Q 10/02 340/932.2 |
| 2012/0152654 A1* | 6/2012 | Marcus | A62B 5/00 182/129 |
| 2012/0161985 A1* | 6/2012 | Amir | G01C 21/3685 340/932.2 |
| 2012/0188101 A1* | 7/2012 | Ganot | G07B 15/02 340/932.2 |
| 2012/0245981 A1* | 9/2012 | Volz | G07B 15/02 705/13 |
| 2012/0274482 A1* | 11/2012 | Chen | G08G 1/144 340/932.2 |
| 2012/0280793 A1* | 11/2012 | Fayfield | G08G 1/142 340/8.1 |
| 2012/0284209 A1* | 11/2012 | Duffy | G07B 15/02 705/418 |
| 2012/0310712 A1* | 12/2012 | Baughman | G07B 15/02 705/13 |
| 2012/0323643 A1* | 12/2012 | Volz | G07B 15/02 705/13 |
| 2013/0113936 A1* | 5/2013 | Cohen | G07B 15/02 348/148 |
| 2013/0143536 A1 | 6/2013 | Ratti | |
| 2013/0191189 A1* | 7/2013 | Aparicio | G07B 15/02 705/13 |
| 2013/0268187 A1* | 10/2013 | Scofield | G01C 21/3685 701/400 |
| 2014/0046874 A1* | 2/2014 | Li | G07B 15/02 705/418 |
| 2014/0058711 A1* | 2/2014 | Scofield | G06Q 10/04 703/6 |
| 2014/0122375 A1* | 5/2014 | Li | G07B 15/02 705/418 |
| 2014/0176349 A1* | 6/2014 | Smullin | G08G 1/142 340/932.2 |
| 2014/0195282 A1 | 7/2014 | Stefik | |
| 2014/0214499 A1* | 7/2014 | Hudson | G07F 17/246 705/13 |
| 2014/0257925 A1* | 9/2014 | Tracy | G06Q 30/0202 705/7.31 |
| 2014/0278081 A1* | 9/2014 | Iwuchukwu | G01C 21/3679 701/519 |
| 2014/0302875 A1* | 10/2014 | Beaurepaire | G08G 1/143 455/456.3 |
| 2014/0309924 A1* | 10/2014 | Varoglu | G01C 21/206 701/410 |
| 2014/0313058 A1* | 10/2014 | Chen | G08G 1/143 340/932.2 |
| 2014/0354453 A1 | 12/2014 | Fourie | |
| 2015/0138001 A1* | 5/2015 | Davies | G08G 1/017 340/932.2 |
| 2015/0279213 A1* | 10/2015 | Balter | G08G 1/144 705/13 |
| 2015/0294431 A1* | 10/2015 | Fiorucci | G06Q 50/26 705/13 |
| 2015/0324709 A1* | 11/2015 | Krivacic | G06Q 10/02 705/5 |
| 2016/0061618 A1* | 3/2016 | Benenson | G01C 21/3453 701/428 |
| 2016/0078759 A1* | 3/2016 | Nerayoff | G06Q 20/145 701/3 |
| 2016/0133134 A1* | 5/2016 | Todasco | G07B 15/02 705/13 |

(56) References Cited

U.S. PATENT DOCUMENTS

| | | | | |
|---|---|---|---|---|
| 2016/0140846 | A1* | 5/2016 | Outwater | G08G 1/144 340/932.2 |
| 2016/0171891 | A1* | 6/2016 | Banatwala | G06Q 30/0255 340/932.2 |
| 2016/0189435 | A1* | 6/2016 | Beaurepaire | G08G 1/005 705/13 |
| 2016/0196747 | A1* | 7/2016 | Tsyrklevich | G08G 1/143 701/532 |
| 2016/0260161 | A1* | 9/2016 | Atchley | G06Q 30/0617 |
| 2016/0306535 | A1* | 10/2016 | Krishnamoorthy | G06T 7/73 |
| 2016/0379495 | A1* | 12/2016 | Engelen | G08G 1/005 340/932.2 |
| 2017/0178511 | A1* | 6/2017 | Berns | G08G 1/142 |
| 2018/0336738 | A1* | 11/2018 | Gibbs | G07B 15/02 |
| 2019/0026690 | A1* | 1/2019 | Wappler | G06Q 50/04 |
| 2019/0108700 | A1* | 4/2019 | Chelnik | G07C 9/00111 |
| 2019/0227555 | A1* | 7/2019 | Sun | G05D 1/0212 |

FOREIGN PATENT DOCUMENTS

| | | | |
|---|---|---|---|
| WO | 2015172161 A1 | | 11/2015 |
| WO | WO-2015172161 A1 | * | 11/2015 |
| WO | 2016193690 A1 | | 12/2016 |
| WO | WO-2016193690 A1 | * | 12/2016 |

OTHER PUBLICATIONS

Danny, Ecker, "Moneyball: Cubs team up with Sox in offering 'dynamic' ticket prices", published by www.chicagobusiness.com on Feb. 18, 2012.

PCT/US16/42920: International Preliminary Report on Patentability.

PCT/US16/42920: Written Opinion of the International Searching Authority.

PCT/US16/42920: International Search Report and References from International Bureau.

* cited by examiner

ONE SIZE FITS ALL BUSINESS MODEL

| # Spaces | Daily Turnover | Per Hour | Average Ticket | Daily Revenue |
|---|---|---|---|---|
| 100 | 2 | $ 3.00 | $ 12.00 | $ 2,400 |
| 0 | 0 | $ - | 0 | 0 |
| 0 | 0 | $ - | 0 | 0 |
| Traditional Theoretical Revenue Daily Total | | | | $ 2,400 |

GIVE CONSUMERS A CHOICE BUSINESS MODEL

| # Spaces | Daily Turnover | Per Hour | Average Ticket | Daily Revenue |
|---|---|---|---|---|
| $ 70 | 2 | $ 2.50 | $ 10.00 | $ 1,400 |
| $$ 25 | 2.5 | $ 8.00 | $$ 21.00 | $$ 1,313 |
| $$$ 5 | 5 | $ 18.00 | $$$ 24.00 | $$$ 600 |
| Tiered Pricing Theoretical Revenue Daily Total | | | | $ 3,313 |
| Upside Revenue Gain | | | | $ 913 |

FIG. 7

SUSTAINABLE REAL-TIME PARKING AVAILABILITY SYSTEM

CROSS REFERENCE TO RELATED APPLICATIONS

This application is a Continuation-in-Part of U.S. patent application Ser. No. 14/821,074 filed Aug. 7, 2015 and PCT/US2016/042920 filed Jul. 19, 2016, herein incorporated by reference in their entirety.

FIELD OF THE INVENTION

The present invention relates in general to a sustainable, real-time parking availability system, and more specifically, to a parking system that manages individual parking spaces in real-time using fluctuating market rates based on demand, convenience, and location. The purpose of the invention is to offer parking consumers a choice in parking price tiers to encourage turnover and maximize revenue streams for the parking asset owner.

BACKGROUND OF THE INVENTION

With cities increasing in size and density, urban parking today in the United States has become a $23 billion dollar industry. The reason for this is simple—parking in dense metropolitan areas is difficult, time-consuming, and expensive. Not only is searching for a vacant—let alone convenient—parking space frustrating for the driver, it is often linked to many additional problems negatively affecting the quality of urban life. For example, the absence of available parking accounts for approximately forty percent of the congestion associated with city driving—contributing to air pollution, driving hazards, and a higher cost of living for city dwellers. For these reasons, parking assets have become a valuable commodity and a source of revenue for city governments, businesses, and owners. Indeed, urban designers now recognize that a well-planned, convenient, and safe parking plan may increase a building's value by fifteen to forty percent in a metropolitan setting. Thus, parking asset owners are beginning to treat their parking facilities as the front doors to their property—the de facto first and last impression on patrons.

In an attempt to allocate parking commodities and reap their potential benefits, cities develop and enforce parking policies aimed at balancing the needs of residents, employers, merchants, and visitors. Traditionally, these parking policies involved a parking consumer spending a fixed amount of money on a parking space for a specified time period, without regard to the location, time of day, or total time spent using the parking space. Thus, the average parking experience required a parking consumer to pay the same price as everyone else, irrespective of whether that parking consumer had the best parking space or the worst.

Over the last few years, major metropolitans have initiated "smart" parking systems in order to reduce parking shortages, raise revenue, and improve urban livability by using sensors, smart phones, and credit cards. However, common problems with "smart" parking systems are that they remain static and do not manage individual parking spaces in "real-time." Thus, changing conditions such as demand, time of day, availability, and the special needs or characteristics of a particular parking consumer are not taken into account. Consequently, a parking consumer pays the same price for an inconveniently located parking space as another parking consumer pays for a premium location. Such parking practices discourage rapid turnover of premium parking spaces, increase cruising and carbon emissions while searching for a conveniently located parking space, and disregards a valuable revenue scheme. Another disadvantage is that such systems require an attendant to monitor groups of parking spaces and initiate penalties—often in the form of parking tickets—to discourage parking policy violations. Thus, costs of enforcement and penalties are added burdens for parking consumers that visit, live, and work in large cities.

Thus, a desire remains to develop a green parking system that manages individual parking spaces in real-time and therefore adapts to constantly changing conditions and market demands to provide parking consumers a choice in premium parking to encourage rapid turnover and reduce carbon emissions.

BRIEF SUMMARY OF THE INVENTION

Therefore, it is a principal object, feature, and/or advantage of the present invention to overcome the aforementioned deficiencies in the art and provide a parking system that gives parking consumers a choice in individual parking spaces set at various price options.

Another object, feature, and/or advantage of the present invention is to provide a parking system that manages individual parking spaces in real-time.

Yet another object, feature, and/or advantage of the present invention is to provide a parking system that charges market rates on individual parking spaces based on demand.

A further object, feature, and/or advantage of the present invention is to provide a green parking system that reduces cruising time and lowers carbon emissions.

A still further object, feature, and/or advantage of the present invention is to provide a parking system that donates a percentage of its revenue to charity.

An object, feature, and/or advantage of the present invention is to provide a parking system that adapts in real-time to constantly changing market conditions and parking consumer demands.

Another object, feature, and/or advantage of the present invention is to provide a parking system that encourages rapid turnover of premium parking spaces.

Yet another object, feature, and/or advantage of the present invention is to provide a parking system that gives parking consumers a choice of individual parking spaces based on location, number of car occupants, walking distance, day of the week, time of the day, personal safety, convenience, price, age of the parking consumer, and/or weather.

A further object, feature, and/or advantage of the present invention is to provide a parking system that is easy to manufacture.

A still further object, feature, and/or advantage of the present invention is to provide a parking system that is easy to use.

An object, feature, and/or advantage of the present invention is to provide a parking system that does not require an attendant to monitor parking spaces.

Another object, feature, and/or advantage of the present invention is to provide a parking system that does not require an attendant to initiate penalties to discourage parking policy violations.

Yet another object, feature, and/or advantage of the present invention is to provide a method of parking using the parking system of the present invention.

A further object, feature, and/or advantage of the present invention is to provide a database for parking asset owners to strategically update and enhance additional operations by incorporating the parking system of the present invention across their parking asset portfolio.

A still further object, feature, and/or advantage of the present invention is to utilize at least one unmanned aerial vehicle ("UAV"), unmanned ground vehicle ("UGV"), unmanned surface vehicle ("USV"), unmanned aerial system ("UAS"), or combinations thereof (collectively, the "unmanned systems technology") as a guidance tool to direct parking consumers to individual parking spaces within a parking facility and as a supervision tool to detect parking violations and suspicious activity.

An object, feature, and/or advantage of the present invention is to provide a parking system that utilizes a parking ambassador.

These and/or other objects, features, and/or advantages of the present invention will be apparent to those skilled in the art. The present invention is not to be limited to or by these objects, features, and advantages. No single aspect need provide each and every object, feature, or advantage.

According to one aspect of the present invention, a real-time parking availability system is provided. Notably, individual parking spaces in the real-time parking availability system may be managed and sold as individual units, rather than as in groups of spaces (e.g., lot, area, zone, facility, or combinations thereof). These individual parking spaces may be marketed and priced separately in real-time using dynamic market conditions. The real-time parking availability system of the present invention offers parking consumers a choice in tiered pricing based on the dynamic market conditions. Parking rate notifications may also be provided, listing current parking rates for the various pricing tiers within a parking facility. A parking selection device may display the current parking prices in each pricing tier for the parking facility, and is configured to allow a parking consumer to select a pricing tier of choice for parking their vehicle. The real-time parking availability system determines in real-time whether an individual parking space is available in the parking tier of choice selected by the parking consumer. If an individual parking space is available in the parking tier of choice, the parking consumer is directed to the available parking space. On the other hand, if an individual parking space is not available in the parking tier of choice, the parking availability system creates more parking spaces within the pricing tier of choice and/or raises prices for the pricing tier in highest demand within the parking facility.

According to another aspect of the present invention, a method of parking using the parking availability system of the present invention is provided. The method includes providing a parking consumer and parking facility. The method further includes providing a parking availability system. The method makes a determination in real-time whether an individual parking space is available in the parking tier of choice selected by the parking consumer. If an individual parking space is available in the parking tier of choice, the parking consumer is directed to the available parking space. Otherwise, if an individual parking space is not available in the parking tier of choice, the parking availability system creates more parking spaces within the pricing tier of choice; and/or raises prices for the pricing tier in highest demand within the parking facility. The method further comprises directing the parking consumer to an available parking space.

Different aspects may meet different objectives of the invention. Other objectives and advantages of this invention will be more apparent in the following detailed description taken in conjunction with the figures. The present invention is not to be limited by or to these objects or aspects.

DESCRIPTION OF FIGURES

FIGS. 1-7 represent real-time parking availability systems of the present invention, and a method of parking utilizing the present invention.

FIG. 1 is an analogous view of a traditional parking system currently used in the market.

FIG. 2 is an analogous view of one aspect of the parking availability system and method of the present invention.

FIG. 3 is a view of the parking availability system and method of the present invention.

FIG. 4 is view of parking rate notifications of the parking availability system and method of the invention of FIG. 3.

FIG. 5 is a view of a parking selection device of the parking availability system and method of the invention of FIG. 4.

FIG. 6 is a view of the parking sensors and parking indicators of the parking availability system and method of the invention of FIG. 5.

FIG. 7 is a view of the benefits offered by the parking availability system and method of the invention of FIG. 3 over traditional parking models.

DETAILED DESCRIPTION OF THE INVENTION

Figure 1:
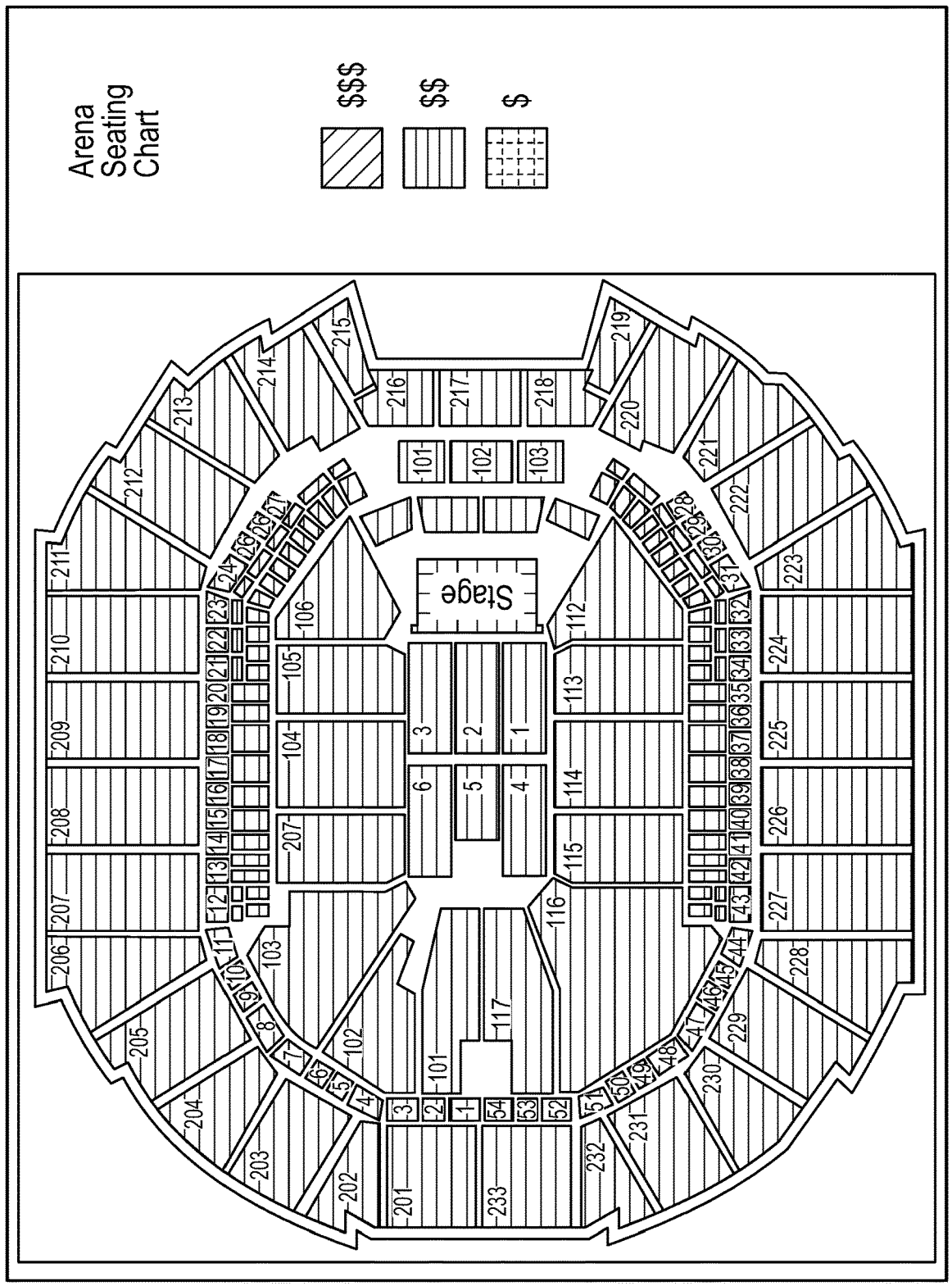
Figure 2:
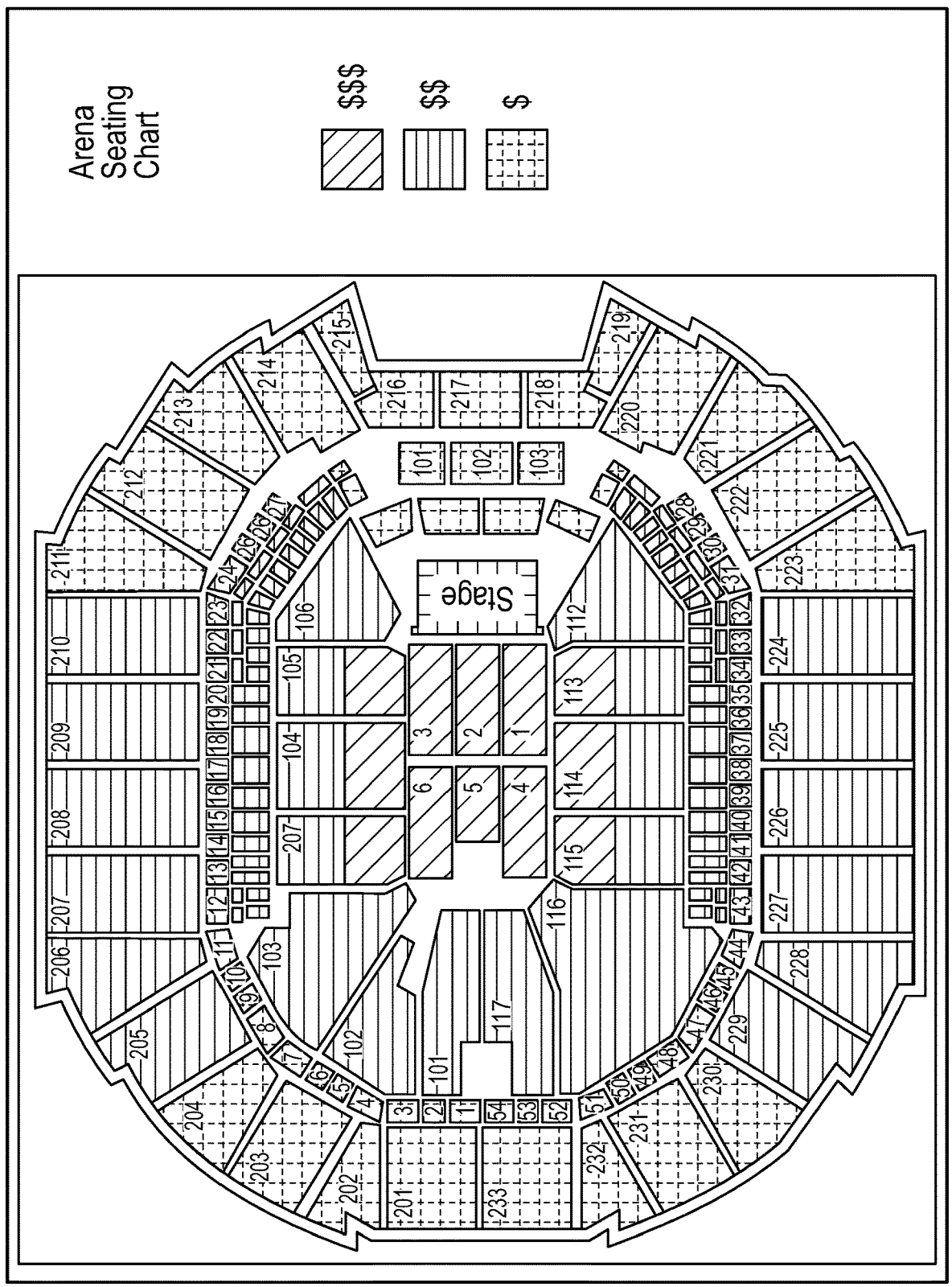

Traditionally, parking assets have been viewed under a one-size fits-all mentality. Akin to a concert arena, first row seats—or premium parking spaces—were priced the same as the nose-bleed section. See FIG. 1. Thus, the average parking experience required a parking consumer to pay the same price as everyone else, irrespective of whether that parking consumer had the best parking space or the worst. Thus, the traditional model discouraged the turnover of premium parking spaces and left valuable revenue streams untapped for the parking asset owner. On the other hand, the present invention turns the traditional parking model into a viable market-driven parking system and method that manages individual parking spaces in real-time with fluctuating market rates based on demand, convenience, and location. Returning to the concert arena analogy, a purpose of the present invention is to offer parking consumers a choice in parking prices to encourage turnover and maximize revenue streams for the parking asset owner. See, e.g., FIG. 2.

Figure 3:
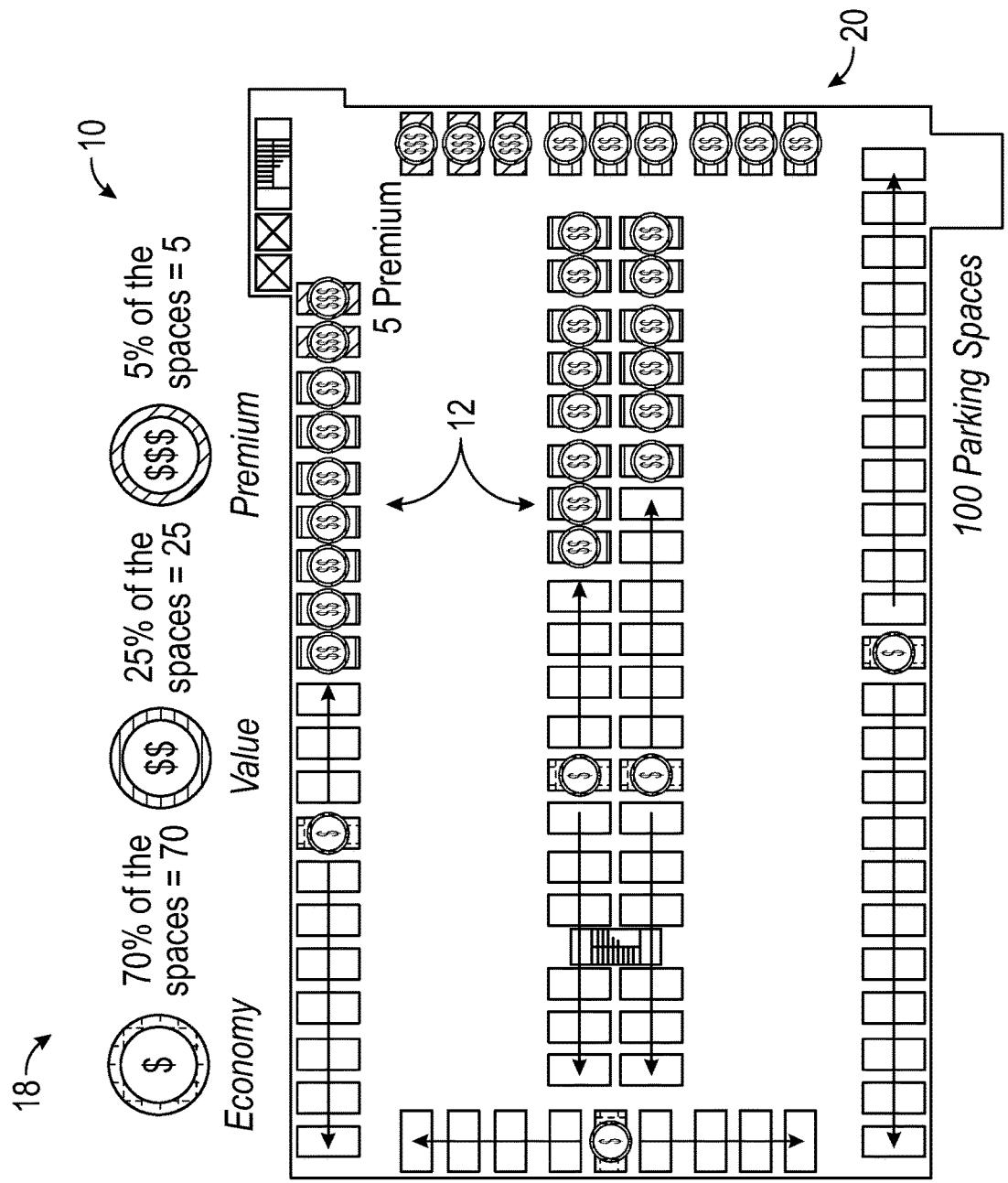

Illustrated in FIG. 3 is one aspect of a real-time parking availability system 10 of the present invention. Notably, a plurality of individual parking spaces 12 in the real-time parking availability system 10 may be managed and sold as individual units, rather than as in groups of spaces (e.g., lot, area, zone, facility or combinations thereof) as managed and sold in traditional parking models. These individual parking spaces 12 may be marketed and priced separately in real-time using dynamic market conditions. These market conditions may include: demand; location of the parking space; walking distance to street level, stairwell, skywalk, elevator, or attached businesses; time of day; day of the week; holidays; special events; number of car occupants; personal safety; convenience; age of the parking consumer; weather conditions; and/or combinations thereof. Thus, the real-time parking availability system 10 of the present invention offers parking consumers 16 a choice in tiered pricing 18 based on rapidly changing market conditions. For example, the top tier of the tiered pricing 18 may include premium parking spaces that are therefore priced expensively ($$$) to encourage rapid turnover. The second tier of the tiered pricing 18 may include value parking spaces that are therefore priced moderately ($$) to encourage a reasonable parking duration. The third tier of the tiered pricing 18 may include economy parking spaces that are therefore priced inexpensively ($) to allow for a longer parking duration. Notably, the pricing tier 18 in highest demand could be any pricing tier 18, not merely the most expensive, and therefore depends on rapidly changing market conditions.

Further shown in FIG. 3 and Example 1, the real-time parking availability system 10 of the present invention may comprise a plurality of individual parking spaces 12 in a single parking facility 20 (e.g., parking garage). Depending on the size of the parking facility 20, the real-time parking availability system 10 may distribute the individual parking spaces into 3-6 pricing tiers 18 with default parking prices.

Example 1

A parking facility includes 100 self-park parking spaces total, wherein the parking spaces may be priced according to a default three tiered pricing distribution plan:
- 70% of the total parking spaces are allocated to the economy ($) pricing tier;
- 25% of the total parking spaces are allocated to the value ($$) pricing tier; and
- 5% of the total parking spaces are allocated to the premium ($$$) pricing tier.

The parking asset owner may change the default prices and the distribution of individual parking spaces 12 within each pricing tier 18 to whatever is desired. Depending on events and market conditions, demand will drive the total number of parking spaces 12 in each pricing tier 18 and the price of individual spaces 12 within the pricing tier 18, wherein the price may change hourly, daily, weekly, biweekly, monthly, or seasonally for individual spaces 12 within the parking facility 20. It is understood in the present invention 10 that the default pricing tiers 18, prices, and number of individual parking spaces 12 within each pricing tier 18 may be determined and set by the owner of the parking facility 20 as desired, and are not to be limited by Example 1. Notably, the individual parking spaces 12 within the pricing tiers 18 of the parking facility 20 are not separated into nested areas or a detached parking lot, area, zone, facility or combinations thereof with exclusive gated entries. Thus, the real-time parking availability system 10 of the present invention is flexible in allowing individual parking spaces 12 within the parking facility 20 to fluctuate between different pricing tiers 18 based on dynamic market conditions.

Figure 4:
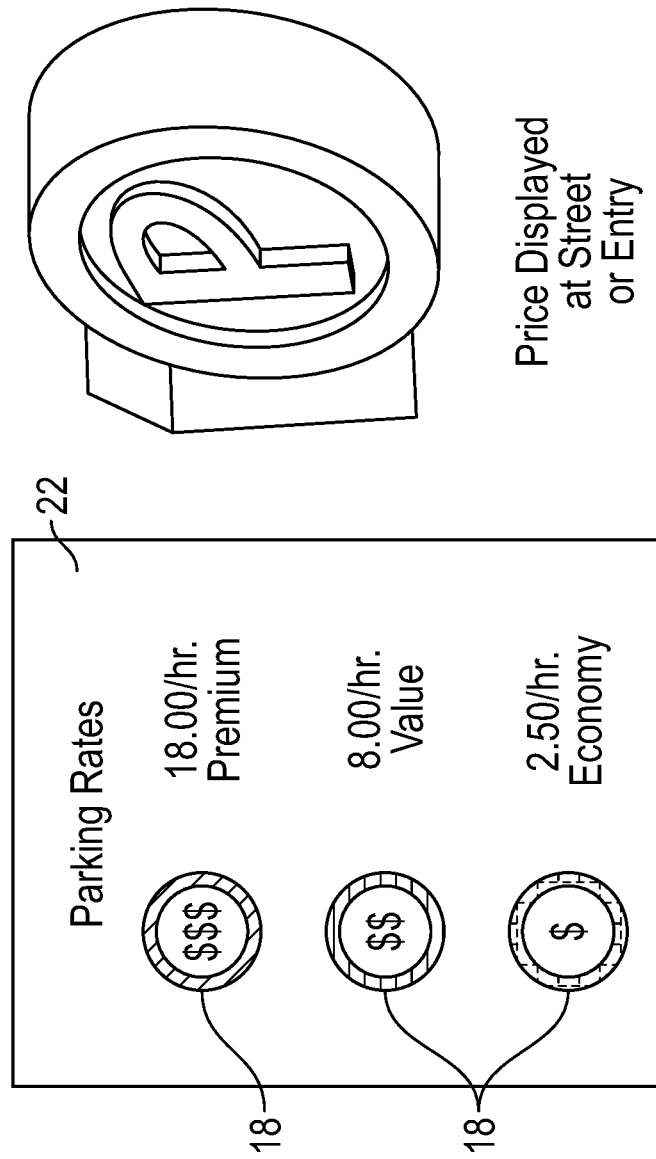

Illustrated in FIG. 4, the real-time parking availability system 10 of the present invention comprises a plurality of parking rate notifications 22 listing current parking rates for the various pricing tiers 18 within the parking facility 20. Parking rate notifications 22 may include, but are not limited to, signs displaying parking prices located on the outside of the parking facility 20 (e.g., street-level), advertisements, electronic notifications to computers, smart phones, and tablets, and/or other means. Parking rate notifications 22 may further include software applications for computers, smart phones, and tablets that inform parking consumers 16 of available parking spaces 12 before the parking consumer 16 enters the parking facility 20. The parking rate notifications 22 should be able to adapt, either manually or automatically, to fluctuating market demands for individual parking spaces 12 within the parking facility 20 and therefore timely display updated prices accordingly. The parking notifications 22 are configured to inform a parking consumer 16 approaching a parking facility 20 of the current parking prices in each pricing tier 18 for the parking facility 20.

Figure 5:
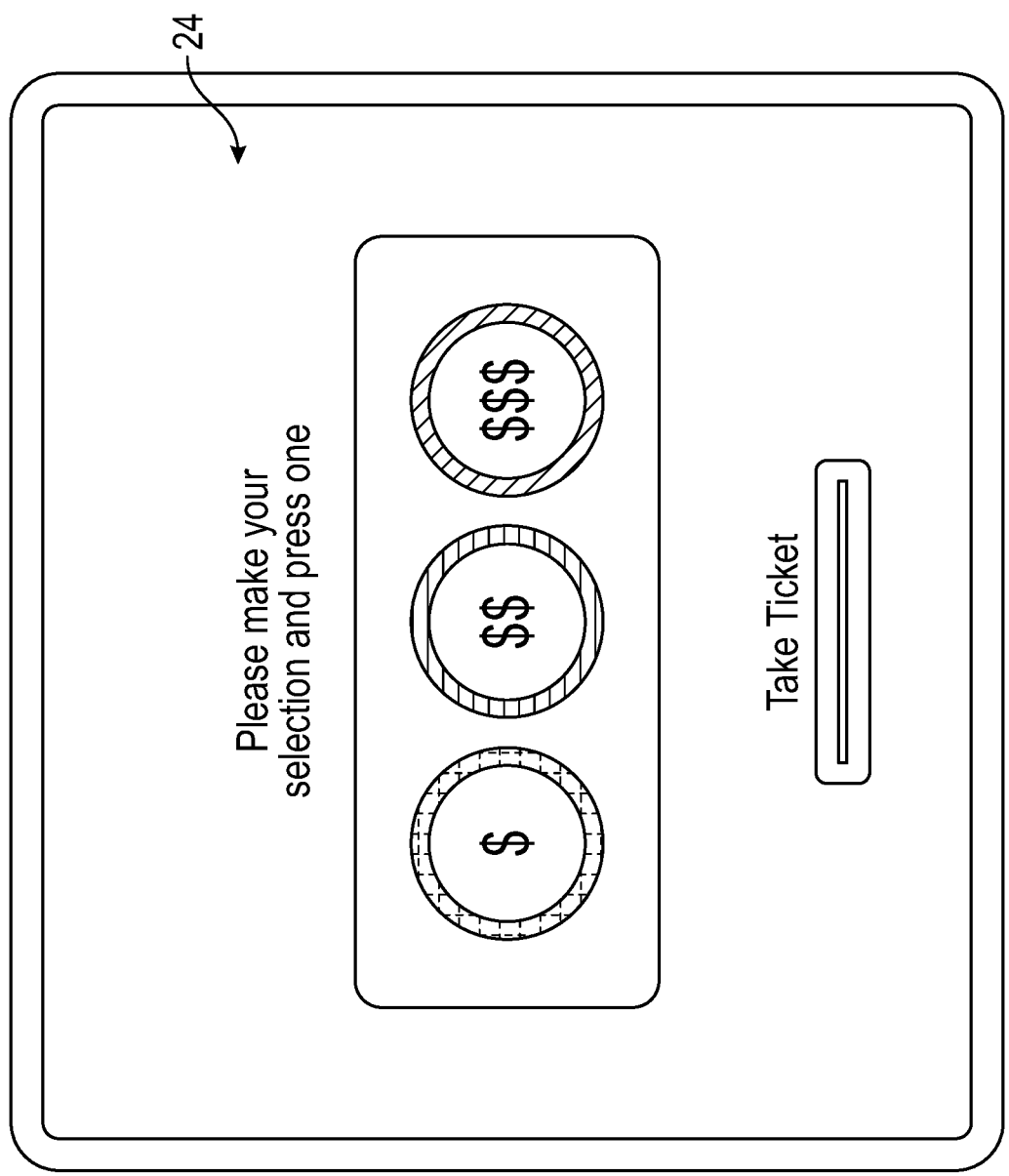

Illustrated in FIG. 5, the real-time parking availability system 10 of the present invention further comprises at least one parking selection device 24 (e.g., kiosk, ticket vending machine, ticket station, computer, smart phones, tablet, and/or other means). The parking selection device 24 may display the current parking prices in each pricing tier 18 for the parking facility 20, and is configured for a parking consumer 16 to select a pricing tier 18 of choice for parking their vehicle within the parking facility 20. Means for selecting a pricing tier 18 of choice from the parking selection device 24 may include pressing an icon on a digital display or pushing a physical button of the parking selection device 24. The parking selection device 24 may also notify the parking consumer 16 that a portion of his/her parking fee has been automatically donated by the parking asset owner to a charitable organization, wherein the real-time parking availability system 10 is configured to allow an owner to set aside a portion of the parking assets for a donation to a charity of choice. The real-time parking availability system 10 determines in real-time whether an individual parking space 12 is available in the parking tier 18 of choice selected by the parking consumer 16. If an individual parking space 12 is available in the parking tier 18 of choice selected by the parking consumer 16, the parking consumer 16 is directed to the available parking space 12 by the real-time parking availability system 10 of the present invention. On the other hand, if an individual parking space 12 is not available in the parking tier 18 of choice selected by the parking consumer 16, the parking availability system 10 of the present invention may offer real-time solutions, including: (1) creating more parking spaces 12 within the pricing tier 18 of choice; and (2) raising prices for the pricing tier 18 in highest demand within the parking facility 20.

The first solution, creating more parking spaces 12 in the pricing tier 18 of choice, may be accomplished by the parking availability system 10 of the present invention in real-time by converting individual parking spaces 12 in a pricing tier 18 of lower demand into a pricing tier 18 of higher demand. For example, a parking consumer 16 may approach a parking facility 20 and select a value pricing tier 18 at the parking selection device 24. However, default pricing tier 18 settings may have limited the number of parking spaces 12 within the value pricing tier 18, whereas technically there are no parking spaces 12 available within the value pricing tier 18. Nevertheless, the parking system 10 of the present invention overcomes this problem by converting an individual parking space 12 within a lower-demand pricing tier, such as the economy pricing tier, into the value pricing tier 18. The parking consumer 16 is then directed by the parking system 10 to the newly created and available value parking space 12 within the pricing tier 18 of choice. Simply put, even though the default settings of the pricing tiers 18 within a parking facility 20 may indicate that a pricing tier 18 is full (e.g., value), nevertheless, if a parking consumer 16 enters a parking facility 20 and still selects the popular pricing tier 18 (e.g., value), they will be directed access to an otherwise proper and available parking space 12 within a pricing tier 18 of lower demand (e.g., economy). Thus, the parking system 10 of the present invention manages individual parking spaces 12 in real-time with fluctuating market rates based on demand, convenience, and location.

The second solution, raising prices for the pricing tier 18 in highest demand within the parking facility 20, may also be accomplished by the parking availability system 10 of the present invention in real-time. For example, a parking consumer 16 may approach a parking facility 20 and select a pricing tier 18 (e.g., premium) at the parking selection device 24. However, default pricing tier 18 settings may have limited the number of parking spaces 12 within the selected pricing tier 18 (e.g., premium) whereas the selected pricing tier 18 is full. The parking consumer 16 may then be notified by the parking system 10 that there are no available parking spaces 12 within the selected pricing tier 18 (e.g., premium), and issued an otherwise proper and available parking space 12 within the remaining pricing tiers 18 (e.g., value or economy), preferably the next pricing tier 18 down. The parking system 10 of the present invention then raises the pricing rates for the full, high-demand pricing tier 18 moving forward (e.g., weekly, biweekly, etc.), which reduces demand and increases turnover.

Figure 6:
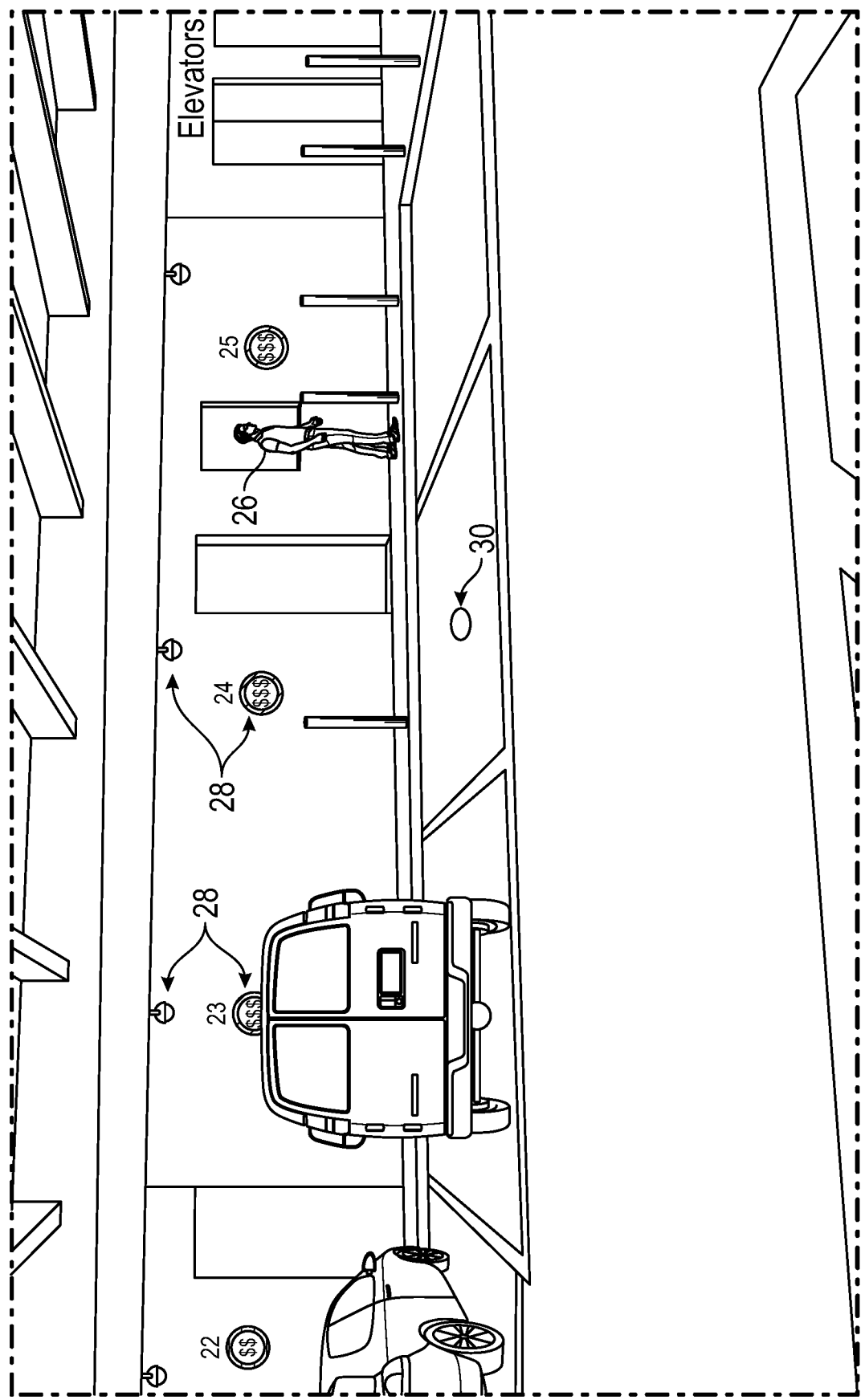

Illustrated in FIG. 6, the real-time parking availability system 10 of the present invention may manage individual parking spaces 12 in real-time using a range of enforcement means including, but not limited to, manual oversight by a mobile parking attendant 26, alarms, and/or parking sensors 30. Such enforcement means ensure a parking consumer 16 parks in an individual parking space 12 within the pricing tier 18 selected by the parking consumer 16 at the parking selection device 24. Preferably, each parking space 12 may be equipped with parking sensors 30 for determining whether a parking space 12 is occupied by a vehicle. The parking sensors 30 may be locally connected to a parking selection device 24, or remotely connected via a server which facilitates communication between the parking sensors 30 and the parking selection device 24. The parking sensors 30 may communicate with the server and parking selection device 24 using a wired or wireless connection to ensure proper parking within the pricing tier 18 chosen by the parking consumer 16. The parking sensors 30 may include automatic vehicle identification, ultrasonic sensors, sonar sensors, and acoustic sensors. The parking sensors 30 may also include camera-based technologies, wherein one parking sensor 30 may be configured to simultaneously monitor several parking spaces 12. Applicable parking sensors 30 may also incorporate pucks fixed onto the street surface or proximate to the parking space 12. It is contemplated that combinations thereof, or other parking sensors 30, may also be utilized. The real-time parking availability system 10 may utilize enforcement means if the system determines that a parking consumer 16 has parked improperly within a pricing tier not selected at the parking selection device 24, wherein the parking consumer may be issued fines, warnings, and/or fees upon leaving the parking facility 18. It is contemplated that additional enforcement means may be also be utilized (e.g., towing). Alternatively, a parking ambassador could be utilized by the real-time parking availability system 10 in lieu of a parking attendant. A parking ambassador may be an observer and source of information for the parking consumer 16, ready to assist in answering questions, offering directions, and highlighting points of interest in the locale. Additionally, the parking ambassador may: act as a valet; act as a greeter at an entrance of a parking facility 18 and/or at an individual parking space 12; open vehicle doors for parking consumers 16; assist parking consumers 18 with packages and luggage; offer surveys to parking consumers 18; escort the parking consumer 18 to a location outside the parking facility 18; arrange for other services during the parking consumers 18 visit such as "guarding" the vehicle or finding taxis; charge electronic vehicles; provide car wash and detailing services; and/or other parking services.

Further shown in FIG. 6, the real-time parking availability system 10 of the present invention utilizes parking indicators 28 to inform parking consumers 16 of the status and location of available parking spaces 12 within their pricing tier 18 of choice. The parking indicators 28 may include automated physical signs, icons, or labels to display in real-time up-to-date information regarding availability and pricing tiers 18 for individual parking spaces 12 within the parking facility 20. These parking indicators 28 may signal a parking consumer 16 that their time has expired, a parking space 12 is reserved, clarify that a particular parking permit is required to park, provide a count-down timer, and display the amount of time available at a parking space 12. Such parking indicators 28 may also incorporate electronic displays locally connected to a parking selection device 24, or remotely connected via a server which facilitates communication between the parking indicator 28 and the parking selection device 24. The parking indicators 28 may communicate with the server and parking selection device 24 using a wired or wireless connection. The parking indicators 28 may be prominently displayed high over the individual parking spaces 12, at street-level, or maintain a low-profile by integrating the parking indicator 28 into a parking curb, the floor of the parking facility 20, and/or having the parking indicator 28 serve as a parking curb itself.

Additionally, parking indicators 28 may include digital displays (not shown) that that may be broadcast wirelessly to nearby motor vehicles using a wireless transmitter locally connected to the parking selection device 24, or remotely connected to a server. Such digital displays may provide directions to available parking spaces 12 within a parking tier 18 chosen by the parking consumer 16. Digital displays may be broadcast over a publicly-accessible network, such as the Internet, and delivered to users electronically through a portable or mobile device with GPS or other location sensing capabilities.

Furthermore, parking indicators 28 may include a color-coded lighting scheme that provides a visual status of available parking, such as incandescent lights, light emitting diodes, reflective surfaces, or other types of lighting schemes. For illustrative purposes, one example of a color-coded lighting scheme may incorporate a red light to indicate a parking space 12 is unavailable, a yellow light to indicate that the parking space 12 will be available soon, and a solid green indicator to indicate that the parking space 12 is available. Additional colors may be incorporated into the lighting scheme, such as blue to indicate handicapped parking, orange to indicate permit parking, and purple to indicate official government parking. Color-coded lighting schemes may also incorporate flashing indicators. Such flashing indicators may represent additional qualifiers for individual parking spaces 12 (e.g., expired time is approaching, loading zones, reserved for guests, etc.). Other colors, color combinations, flash strobes, color-coding schemes, and adjusted lighting may also be utilized by parking indicators 28 in the present invention 10. Parking indicators 28 may also incorporate shapes, positions, alphanumeric symbols, and/or icons to differentiate alternating states of parking availability. It is contemplated that the parking indicators 28 of the parking availability system 10 of the present invention may further incorporate combinations of the above.

The parking indicators 28 may also comprise unmanned systems technology. In particular, the unmanned systems technology may comprise at least one UAV, UGV and/or USV (collectively, the "drone"), a controller and a communication link between the drone and the controller. The drone may include parking sensors 30 and/or camera based technologies (e.g., visible imaging, thermal-infrared imaging). The communication link may be a wired or wireless connection (e.g., Bluetooth, Wi-Fi, radio, broadband, satellite, MAVLink). The controller may comprise integrated circuits, sensors, onboard computers, remote computers, software and/or combinations thereof to provide for autonomous and/or human operation of the drone. The controller may be configured to autonomously operate the drone using a set of pre-programmed commands, artificial intelligence, and/or machine learning. Alternatively or in addition thereto, the controller may be configured to operate the drone via a remote human operator. The unmanned systems technology may further comprise at least one docking station configured to charge the drone and to provide software updates as needed to the drone. Multiple drones may be automatically deployed within the parking facility 20 based on demand as determined in real-time by a management application, wherein the drones are configured to return to their docking stations when not in use. The unmanned systems technology may communicate with the server, the parking selection device 24, the parking sensors 30, and the other parking indicators 28 of the parking availability system 10 using a wired or wireless connection.

The unmanned systems technology may operate as a guidance tool to direct parking consumers 16 to available individual parking spaces 12 within a parking facility 20. When in operation as a guidance tool, the unmanned system technology is configured to initiate after the parking consumer 16 selects a pricing tier 18 from the parking selection device 24. Once initiated, the drone is configured to leave the docking station and locate (e.g., hover or sit) at a predetermined distance in front of the vehicle of the parking consumer 16. The drone may lock onto the vehicle using the camera based technologies and the vehicle's unique physical characteristics (e.g., color, make, model and/or manufacturer), license plate recognition technology, or combinations thereof. Alternatively or in addition thereto, the drone may lock onto the vehicle of the parking consumer 16 via radio-frequency ("RFID") identification using an RFID tag previously provided to the parking consumer 16. Using GPS, parking sensors 30 and/or its camera based technologies, the drone may be configured to autonomously lead, or digitally tow, the locked onto vehicle of the parking consumer 16 to an available individual parking space within the selected pricing tier 18 or otherwise proper and available individual parking space. Alternatively or in addition thereto, a human may operate the drone to lead, or digitally tow, the locked onto vehicle of the parking consumer 16 to an available individual parking space within the selected pricing tier 18 or otherwise proper and available individual parking space. The drone may incorporate other parking indicators 28 such as the color-coded lighting schemes, alarms, flashing indicators, automated signs, and/or digital displays to further assist leading the vehicle of the parking consumer 16. The speed by which the drone leads the vehicle of the parking consumer 16 through the parking facility 20 may be pre-determinately set to prevent speeding through the facility or may be responsive to the speed of the vehicle to keep a predetermined distance between the drone and the vehicle. After the vehicle of the parking consumer 16 is parked in the available individual parking space within the selected pricing tier 18, the drone may be configured to return to its docking station. The drone may also be configured to escort the vehicle of the parking consumer 16 to an exit of the parking facility 20 or to a pre-determined location.

The unmanned systems technology may also be configured to be compatible with driverless or autonomous vehicles, wherein the drone may lead the driverless vehicle to an available individual parking space within the selected pricing tier 18 and/or retrieve the driverless vehicle parked in the parking facility 20 and escort the driverless vehicle to a pre-determined pick up location or to an exit of the parking facility 20.

The unmanned systems technology may further operate as a supervision tool of the parking facility 20. In particular, if the vehicle of the parking consumer 16 deviates from the path lead by the drone and/or in appropriately parks in available individual parking space that is not within the selected pricing tier 18, corrective action may be taken. Such corrective action may include utilization of other parking indicators 28 such as the color-coded lighting schemes, alarms, flashing indicators, automated signs, and/or digital displays on the drone and/or throughout the parking facility 20 to notify the parking consumer 16 of the impropriety. Corrective action may also include the issuance of digital/audible citations or alerts to the parking consumer 16. Corrective action may further include the unmanned systems technology alerting the real-time parking availability system 10 of the impropriety. Corrective action may also include the real-time parking availability system utilizing its range of enforcement means, as detailed above. The unmanned systems technology may additionally operate as a supervision tool of the parking facility 20 by running security patrols, identifying suspicious activity, locating people or pets in vehicles that may be susceptible to harmful environmental conditions, and policing illegally parked vehicles in the parking facility 20. The unmanned systems technology may further be configured to operate as the parking ambassador and/or mobile parking attendant 26. The parking indicators 28, parking sensors 30, and parking selection device 24 may be coupled via appropriate circuitry and connections to enable the parking availability system 10 to perform the functions and operations described herein. The parking availability system 10 of the present invention comprises suitable components necessary to receive, store and execute appropriate computer instructions. Particularly, the parking availability system 10 includes: storage for electronic program instructions, information and/or data; a display for displaying a user interface and input means; and a processor. The storage may comprise read only memory (ROM) and random access memory (RAM). The parking availability system 10 is configured to receive instructions that may be held in the ROM or RAM and may be executed by the processor. The processor is operable to perform actions under control of electronic program instructions, including processing/executing instructions and managing the flow of data and information through the parking availability system 10. Electronic program instructions for the parking availability system 10 may be provided via a single software application (app) or module. The app can be downloaded from a website (or other suitable electronic device platform) or otherwise saved to or stored on storage of the parking availability system 10. The parking availability system 10 also includes an operating system which is capable of issuing commands and is arranged to interact with the app to cause the device to carry out the respective steps, functions and/or procedures in accordance with the invention described herein. The parking availability system 10 is operable to communicate via one or more communications link(s), which may variously connect to one or more remote servers, personal computers, terminals, wireless or handheld computing devices, landline communication devices, or mobile communication devices such as a mobile (cell) telephone. At least one of a plurality of communications link(s) may be connected to an external computing network through a telecommunications network. The server may be physically located at a centrally managed control station, offsite from the parking facility 20, at the facility itself, or may be held on a cloud based platform.

The server may comprise suitable components necessary to receive, store and execute appropriate electronic program instructions. The components include processing means in the form of a server processor, server storage comprising read only memory (ROM) and random access memory (RAM), one or more server input/output devices such as disc drives, and an associated server user interface. The server may be capable of receiving instructions that may be held in ROM, RAM or disc drives and may be executed by the server processor. The server processor is operable to perform actions under control of electronic program instructions, including processing/executing instructions and managing the flow of data and information through the parking availability system 10.

The server may include a server operating system which is capable of issuing commands to access a plurality of databases or databanks which reside on the storage device thereof. The operating system is arranged to interact with databases and one or more computer programs of a set/suit of server software to cause the server to carry out the respective steps, functions and/or procedures in accordance with the invention described herein. Additionally, information stored in the databases may be obtained from license plate identification readers and/or electronic surveillance, wherein such information may be used to track consumer behavior for taxation purposes, tolls, traffic congestion, price models, taxes, transportation, retail services, corporate real estate, and other parking services. The app, computer programs of the server software set, and other electronic instructions or programs for the computing components of the parking availability system 10 and the server can be written in any suitable language, as are well known to persons skilled in the art. The electronic program instructions may be provided as stand-alone application(s), as a set or plurality of applications, via a network, or added as middleware, depending on the requirements of the implementation or embodiment. The software may comprise one or more modules, and may be implemented in hardware. In such a case, for example, the modules may be implemented with any one or a combination of the following technologies, which are each well known in the art: a discreet logic circuit(s) having logic gates for implementing logic functions upon data signals, an application specific integrated circuit (ASIC) having appropriate combinational logic gates, a programmable gate array(s) (PGA), a field programmable gate array (FPGA) and the like. The respective computing means can be a system of any suitable type, including: a programmable logic controller (PLC); digital signal processor (DSP); microcontroller; personal, notebook or tablet computer, or dedicated servers or networked servers. The respective processors can be any custom made or commercially available processor, a central processing unit (CPU), a data signal processor (DSP) or an auxiliary processor among several processors associated with the computing means. In embodiments of the invention, the processing means may be a semiconductor based microprocessor (in the form of a microchip) or a macroprocessor, for example.

In the present invention, the respective storage can include any one or combination of volatile memory elements (e.g., random access memory (RAM) such as dynamic random access memory (DRAM), static random access memory (SRAM)) and non-volatile memory elements (e.g., read only memory (ROM), erasable programmable read only memory (EPROM), electronically erasable programmable read only memory (EEPROM), programmable read only memory (PROM), tape, compact disc read only memory (CD-ROM), etc.). The respective storage may incorporate electronic, magnetic, optical and/or other types of storage media. Furthermore, the respective storage can have a distributed architecture, where various components are situated remote from one another, but can be accessed by the processing means. For example, the ROM may store various instructions, programs, software, or applications to be executed by the processing means to control the operation of the parking availability system 10 and the RAM may temporarily store variables or results of the operations.

The use and operation of computers using software applications is well-known to persons skilled in the art and need not be described in any further detail herein except as is relevant to the present invention. Prices may be adjusted automatically in real-time by the management application via use of a demand/supply algorithm or calculation processing the relevant factors. Additional and/or alternative factors may be used in determining dynamic parking conditions and pricing. Once the parking conditions and rates are established, they are logged through the management application to be stored on the server and then communicated to the parking selection device 24. Thus, individual parking spaces 12 may be monitored and prices adjusted in real-time to account for ever-changing market demands. Furthermore, any suitable communication protocol can be used to facilitate connection and communication between any subsystems or components of the parking availability system 10, any subsystems or components of the server, and other devices or systems, including wired and wireless, as are well known to persons skilled in the art and need not be described in any further detail herein except as is relevant to the present invention.

Illustrated in FIG. 7, the benefits of managing individual parking spaces 12 in real-time and offering parking consumers 16 a choice in tiered pricing demonstrates that parking asset owners may increase their daily revenue totals by 10-40% or more using the parking availability system 10 and method of parking of the present invention. Additional benefits to parking asset owners include improved service to customers, reducing carbon emissions, mitigating transportation demand, re-investing in value-added parking solutions, saving time through stream-lined parking operations, and demonstrating to the public they are eco-friendly. Benefits to parking consumers 16 include furthering a green initiative, reducing carbon emissions, saving gasoline costs, saving time, and lowering stress and frustration of finding available and convenient parking. Thus, the parking availability system 10 and method of parking using the present invention allows parking asset owners to respond to parking demand with real-time availability and price data, and help them generate significant upside revenues to invest in their parking asset and use sustainable green parking measures.

According to another aspect of the present invention, a method of parking using the parking availability system 10 of the present invention is provided. Illustrated in FIG. 3, the method of the present invention comprises providing a plurality of individual parking spaces 12 managed and sold as individual units within a parking facility 20. These individual parking spaces 12 may be marketed and priced separately in real-time using dynamic market conditions. The method of the present invention further provides offering parking consumers 16 a choice in tiered pricing 18 based on rapidly changing market conditions. For example, a top tier of the tiered pricing 18 may include premium parking spaces of high-demand that are therefore priced expensively ($$$) to encourage rapid turnover. A second tier of the tiered pricing 18 may include value parking spaces of medium-demand that are therefore priced moderately ($$) to encourage a reasonable parking duration. A third tier of the tiered pricing 18 may include economy parking spaces of low-demand that are therefore priced inexpensively ($) to allow for a longer parking duration. The parking asset owner may change the default prices and the distribution of individual parking spaces 12 within each pricing tier 18 to whatever is desired. Depending on events and market conditions, demand will drive the total number of parking spaces 12 in each pricing tier 18 and the price of individual spaces 12 within the pricing tier 18, wherein the price may change hourly, daily, weekly, biweekly, monthly, or seasonally for individual spaces 12 within the parking facility 20. It is understood in the present invention 10 that the default pricing tiers 18, prices, and number of individual parking spaces 12 within each pricing tier 18 may be determined and set by the owner of the parking facility 20 as desired, and are not to be limited by Example 1. Notably, the individual parking spaces 12 within the pricing tiers 18 of the parking facility 20 are not separated into nested areas or a detached parking lot, area, zone, facility or combinations thereof with exclusive gated entries. Thus, the real-time parking availability system 10 of the present invention is flexible in allowing individual parking spaces 12 within the parking facility 20 to fluctuate between different pricing tiers 18 based on dynamic market conditions.

Illustrated in FIG. 4, the method of the present invention comprises providing a plurality of parking rate notifications 22 listing current parking rates for the various pricing tiers 18 within the parking facility 20. Parking rate notifications 22 may include, but are not limited to, signs displaying parking prices located on the outside of the parking facility 20 (e.g., street-level), advertisements, electronic notifications to computers, smart phones, and tablets, and/or other means. Parking rate notifications 22 may further include software applications for computers, smart phones, and tablets that inform parking consumers 16 of available parking spaces 12 before the parking consumer 16 enters the parking facility 20. The parking rate notifications 22 should be able to adapt, either manually or automatically, to fluctuating market demands for individual parking spaces 12 within the parking facility 20 and therefore timely display updated prices accordingly. The parking notifications 22 are configured to inform a parking consumer 16 approaching a parking facility 20 of the current parking prices in each pricing tier 18 for the parking facility 20.

Illustrated in FIG. 5, the method of the present invention further comprises providing at least one parking selection device 24 (e.g., kiosk, ticket vending machine, ticket station, computer, smart phones, tablet, and/or other means). The parking selection device 24 may display the current parking prices in each pricing tier 18 for the parking facility 20, and is configured to allow a parking consumer 16 to select a pricing tier 18 of choice for parking their vehicle within the parking facility 20. A parking consumer selects a pricing tier 18 of choice from the parking selection device 24, for example, by pressing an icon on a digital display or pushing a physical button of the parking selection device 24. The parking selection device 24 may also notify the parking consumer 16 that a portion of his/her parking fee has been automatically donated by the parking asset owner to a charitable organization, wherein the real-time parking availability system 10 is configured to allow an owner to set aside a portion of the parking assets for a donation to a charity of choice. The real-time parking availability system 10 determines in real-time whether an individual parking space 12 is available in the parking tier 18 of choice selected by the parking consumer 16. If an individual parking space 12 is available in the parking tier 18 of choice selected by the parking consumer 16, the parking consumer 16 is directed to the available parking space 12 by the real-time parking availability system 10 of the present invention. On the other hand, if an individual parking space 12 is not available in the parking tier 18 of choice selected by the parking consumer 16, the method of the present invention may offer real-time solutions, including: (1) creating more parking spaces 12 within the pricing tier 18 of choice; and (2) raising prices for the pricing tier 18 in highest demand within the parking facility 20.

The first solution, may be accomplished by the method of the present invention in real-time by converting individual parking spaces 12 in a pricing tier 18 of lower demand into a pricing tier 18 of higher demand, effectively creating more parking spaces 12 in the pricing tier 18 of choice. For example, a parking consumer 16 may approach a parking facility 20 and select a value pricing tier 18 at the parking selection device 24. However, default pricing tier 18 settings may have limited the number of parking spaces 12 within the value pricing tier 18, whereas technically there are no parking spaces 12 available within the value pricing tier 18. Nevertheless, the method of the present invention overcomes this problem by converting an individual parking space 12 within a lower-demand pricing tier, such as the economy pricing tier, into the value pricing tier 18. The parking consumer 16 is then directed by the parking system 10 to the newly created and available value parking space 12 within the pricing tier 18 of choice. Simply put, even though the default settings of the pricing tiers 18 within a parking facility 20 may indicate that a pricing tier 18 is full (e.g., value), nevertheless, if a parking consumer 16 enters a parking facility 20 and still selects the popular pricing tier 18 (e.g., value), they will be directed access to an otherwise proper and available parking space 12 within a pricing tier 18 of lower demand (e.g., economy). Thus, the parking system 10 of the present invention manages individual parking spaces 12 in real-time with fluctuating market rates based on demand, convenience, and location.

The second solution may also be accomplished by the method of the present invention in real-time by raising prices for the pricing tier 18 in highest demand within the parking facility 20. For example, a parking consumer 16 may approach a parking facility 20 and select a pricing tier 18 (e.g., premium) at the parking selection device 24. However, default pricing tier 18 settings may have limited the number of parking spaces 12 within the selected pricing tier 18 (e.g., premium) whereas the selected pricing tier 18 is full. The parking consumer 16 may then be notified by the parking system 10 that there are no available parking spaces 12 within the selected pricing tier 18 (e.g., premium) and issued an otherwise proper and available parking space 12 within the remaining pricing tiers 18 (e.g., value or economy), preferably the next pricing tier 18 down. The method of the present invention then raises the pricing rates for the full, high-demand pricing tiers 18 moving forward (e.g., weekly, biweekly, etc.) which reduces demand and increases turnover.

Illustrated in FIG. 6, the method of the present invention may manage individual parking spaces 12 in real-time using a range of enforcement means including, but not limited to, manual oversight by a mobile parking attendant 26, alarms, and/or parking sensors 30. Such enforcement means ensure a parking consumer 16 parks in an individual parking space 12 within the pricing tier 18 selected by the parking consumer 16 at the parking selection device 24. Preferably, each parking space 12 may be equipped with parking sensors 30 for determining whether a parking space 12 is occupied by a vehicle. The parking sensors 30 may be locally connected to a parking selection device 24, or remotely connected via a server which facilitates communication between the parking sensors 30 and the parking selection device 24. The parking sensors 30 may communicate with the server and parking selection device 24 using a wired or wireless connection to ensure proper parking within the pricing tier 18 chosen by the parking consumer 16. The parking sensors 30 may include automatic vehicle identification, ultrasonic sensors, sonar sensors, and acoustic sensors. The parking sensors 30 may also include camera-based technologies, wherein one parking sensor 30 may be configured to simultaneously monitor several parking spaces 12. Applicable parking sensors 30 may also incorporate pucks fixed onto the street surface or proximate to the parking space 12. It is contemplated that combinations thereof, or other parking sensors 30, may also be utilized. The real-time parking availability system 10 may utilize enforcement means if the system determines that a parking consumer 16 has parked improperly within a pricing tier not selected at the parking selection device 24, wherein the parking consumer may be issued fines, warnings, and/or fees upon leaving the parking facility 18. It is contemplated that additional enforcement means may be also be utilized (e.g., towing). Alternatively, a parking ambassador could be utilized by the method of the present invention in lieu of a parking attendant. A parking ambassador may be an observer and source of information for the parking consumer 16, ready to assist in answering questions, offering directions, and highlighting points of interest in the locale. Additionally, the parking ambassador may: act as a valet; act as a greeter at an entrance of a parking facility 18 and/or at an individual parking space 12; open vehicle doors for parking consumers 16; assist parking consumers 18 with packages and luggage; offer surveys to parking consumers 18; escort the parking consumer 18 to a location outside the parking facility 18; arrange for other services during the parking consumers 18 visit such as "guarding" the vehicle or finding taxis; charge electronic vehicles; provide car wash and detailing services; and/or other parking services.

Further shown in FIG. 6, the method of the present invention further provides parking indicators 28 to inform parking consumers 16 of the status and location of available parking spaces 12 within their pricing tier 18 of choice. The parking indicators 28 may include automated physical signs, icons, or labels to display in real-time up-to-date information regarding availability and pricing tiers 18 for individual parking spaces 12 within the parking facility 20. These parking indicators 28 may signal a parking consumer 16 that their time has expired, a parking space 12 is reserved, clarify that a particular parking permit is required to park, provide a count-down timer, and display the amount of time available at a parking space 12. Such parking indicators 28 may also incorporate electronic displays locally connected to a parking selection device 24, or remotely connected via a server which facilitates communication between the parking indicator 28 and the parking selection device 24. The method may further comprise providing parking indicators 28 that comprise unmanned systems technology and operate as a guidance tool to direct parking consumers 16 to appropriate individual parking spaces 12 within a parking facility 20 and/or as a supervision tool of the parking facility 20, as further detailed above. The unmanned systems technology may further be configured to operate as the parking ambassador and/or mobile parking attendant 26. The parking indicators 28 may communicate with the server and parking selection device 24 using a wired or wireless connection. The parking indicators 28 may be prominently displayed high over the individual parking spaces 12, at street-level, or maintain a low-profile by integrating the parking indicator 28 into a parking curb, the floor of the parking facility 20, and/or having the parking indicator 28 serve as a parking curb itself. Thus, the method of the present invention utilizes the parking availability system 10 to manage individual parking spaces in real-time with fluctuating market rates based on demand, convenience, and location.

The parking availability system 10 and method of parking of the present invention is intended to use green technology, practices, and strategies to achieve LEED certification. The parking availability system 10 and method of parking of the present invention are universally applicable to parking facilities 18 of all shapes and sizes, locations, and constructions and is intended to use green technology, practices, and strategies throughout to achieve LEED certification. Furthermore, while intended for personal vehicles, the parking availability system 10 and method of parking of the present invention may be used for vehicles of all sizes, makes, models, and manufacturers. Although the invention has been described and illustrated with respect to preferred aspects thereof, it is not to be so limited since changes and modifications may be made therein which are within the full intended scope of the invention.

What is claimed is:
1. A real-time parking availability system, comprising:
a parking facility;
a plurality of individual parking spaces within the parking facility;
a plurality of pricing tiers for the individual parking spaces within the parking facility;
at least one parking selection device, the at least one parking selection device comprising:
 a) a display listing parking prices for the plurality of pricing tiers for the individual parking spaces that are within the parking facility; and
 b) an option to select a pricing tier from the plurality of pricing tiers for the individual parking spaces that are within the parking facility, wherein the at least one parking selection device is configured to receive the selection;
at least one parking sensor in communication with the at least one parking selection device;
the at least one parking sensor configured to determine in real-time whether an individual parking space is available in a selected pricing tier;
a management application in communication with the at least one parking selection device and the at least one parking sensor;
the management application is configured to automatically adjust parking prices for the plurality of pricing tiers for the individual parking spaces in real-time; and the real-time parking availability system configured to provide two real-time solutions when an individual parking space within the selected pricing tier is not available in the parking facility:
- a) the first real-time solution comprising electronically creating a new individual parking space within the selected pricing tier by reallocating an available individual parking space within a pricing tier of lower demand into the selected pricing tier;
- b) the second real-time solution comprising decreasing demand for individual parking spaces within a pricing tier of higher demand in the parking facility by increasing prices for the individual parking spaces within the pricing tier of higher demand.

2. The real-time parking availability system of claim 1, further comprising:
at least one parking indicator configured to notify a consumer of a location of an available individual parking space within the selected pricing tier.

3. The real-time parking availability system of claim 2, wherein the at least one parking indicator comprises unmanned systems technology.

4. The real-time parking availability system of claim 3, wherein the unmanned systems technology comprises at least one drone, a controller, a communication link between the at least one drone and controller, and at least one docking station configured to charge the at least one drone.

5. The real-time parking availability system of claim 4, wherein the unmanned systems technology is configured to operate as a guidance tool to direct the consumer to the available individual parking space within the selected pricing tier and/or to an exit of the parking facility.

6. The real-time parking availability system of claim 5, further comprising:
the unmanned systems technology configured to initiate after the consumer selects a pricing tier from the parking selection device;
the at least one drone configured to leave the at least one docking station and locate at a predetermined distance in front of the vehicle of the consumer;
the at least one drone configured to lock onto the vehicle of the consumer;
the at least one drone configured to lead the locked onto vehicle of the consumer to the available individual parking space within the selected pricing tier;
the at least one drone configured to return to the at least one docking station after the vehicle of the consumer is parked in the available individual parking space within the selected pricing tier.

7. The real-time parking availability system of claim 6, wherein the at least one drone incorporates color-coded lighting schemes, alarms, flashing indicators, automated signs, digital displays or combinations thereof to assist leading the vehicle of the consumer.

8. The real-time parking availability system of claim 6, wherein the speed by which the drone is configured to lead the vehicle of the consumer is pre-determinately set to prevent speeding through the parking facility.

9. The real-time parking availability system of claim 6, wherein the speed by which the drone is configured to lead the vehicle of the consumer is responsive to the speed of the vehicle to keep a predetermined distance between the drone and the vehicle.

10. The real-time parking availability system of claim 6, wherein the unmanned systems technology in operation as a guidance tool is configured to be compatible with driverless vehicles.

11. The real-time parking availability system of claim 4, wherein the unmanned systems technology is configured to operate as a supervision tool of the parking facility.

12. The real-time parking availability system of claim 11, further comprising:
the unmanned systems technology configured to take corrective action when the vehicle of the consumer deviates from a path led by the at least one drone and/or improperly parks in an available individual parking space that is not within the selected pricing tier.

13. The real-time parking availability system of claim 12, wherein the corrective action comprises:
notification to the consumer of the impropriety via color-coded lighting schemes, alarms, flashing indicators, automated signs, and/or digital displays on the at least one drone and/or parking indicators in the parking facility;
the issuance of digital/audible citations or alerts to the consumer;
utilization of enforcement means by the real-time parking availability system; or
combinations thereof.

14. The real-time parking availability system of claim 11, further comprising:
the unmanned systems technology configured to run security patrols;
the unmanned systems technology configured to identify suspicious activity in the parking facility;
the unmanned systems technology configured to locate people or pets in vehicles that may be susceptible to harmful environmental conditions;
the unmanned systems technology configured to police illegally parked vehicles in the parking facility; and
combinations thereof.

15. The real-time parking availability system of claim 2, further comprising a plurality of parking rate notifications configured to display the plurality of pricing tiers for the individual parking spaces within the parking facility.

16. The real-time parking availability system of claim 15, wherein the at least one parking selection device is configured to donate to a charitable organization and/or provide notification to the consumer that a portion of the consumer's parking fee has been donated to the charitable organization.

17. The real-time parking availability system of claim 1, wherein daily revenue totals for the parking facility improve compared to flat fee pricing.

18. A method of managing a parking facility, comprising:
providing a parking facility;
distributing a plurality of individual parking spaces within the parking facility;
establishing a plurality of pricing tiers for the individual parking spaces;
providing a plurality of parking rate notifications configured to display the plurality of pricing tiers for the individual parking spaces;
providing at least one parking selection device;
providing an option on the at least one parking selection device to select a pricing tier from the plurality of pricing tiers;
selecting a pricing tier from the plurality of pricing tiers via the at least one parking selection device;
providing at least one parking sensor in communication with the at least one parking selection device;
determining in real time whether an individual parking space is available within the selected pricing tier in the parking facility via the at least one parking sensor;

providing a management application in communication with the at least one parking selection device and the at least one parking sensor;

providing direction to the available individual parking space within the selected pricing tier via at least one parking indicator;

providing two real-time solutions when no individual parking space within the selected pricing tier is available in the parking facility;

the first real-time solution comprising:
- a) designating an available individual parking space within a pricing tier of lower demand;
- b) reallocating the available individual parking space within the pricing tier of lower demand into the selected pricing tier;
- c) electronically creating a new individual parking space within the selected pricing tier;
- d) providing direction to the new individual parking space within the selected pricing tier;

the second real-time solution comprising:
- a) providing notification that an individual parking space within the selected pricing tier is unavailable;
- b) designating an available individual parking space within another pricing tier;
- c) providing direction to the available individual parking space within the other pricing tier; and
- d) decreasing demand for the individual parking spaces within a pricing tier of higher demand in the parking facility by increasing prices for the individual parking spaces within the pricing tier of higher demand to increase turnover;

providing direction to the new individual parking space or to the available individual parking space within the other pricing tier via the at least one parking indicator;

confirming whether the consumer properly parks in the new individual parking space or the available individual parking space; and taking corrective action when the consumer parks improperly.

19. The method of parking of claim 18, further comprising:

providing at least one parking indicator that comprises unmanned systems technology; and operating the unmanned systems technology as a guidance tool; and/or as a supervision tool of the parking facility.

* * * * *

UNITED STATES PATENT AND TRADEMARK OFFICE
CERTIFICATE OF CORRECTION

PATENT NO. : 10,565,804 B2
APPLICATION NO. : 16/382841
DATED : February 18, 2020
INVENTOR(S) : Warren C. Vander Helm, David L. Vogel and Michael T. Holm Page 1 of 1

It is certified that error appears in the above-identified patent and that said Letters Patent is hereby corrected as shown below:

In the Claims

Column 20, Lines 16-22, should read:
19. The method of parking of claim 18, further comprising: providing at least one parking indicator that comprises unmanned systems technology; and
operating the unmanned systems technology as a guidance tool and/or as a supervision tool of the parking facility.

Signed and Sealed this
Fifteenth Day of September, 2020

Andrei Iancu
*Director of the United States Patent and Trademark Office*